No. 826,143. PATENTED JULY 17, 1906.
J. C. COLE.
TIRE CONSTRUCTION.
APPLICATION FILED MAR. 16, 1905.
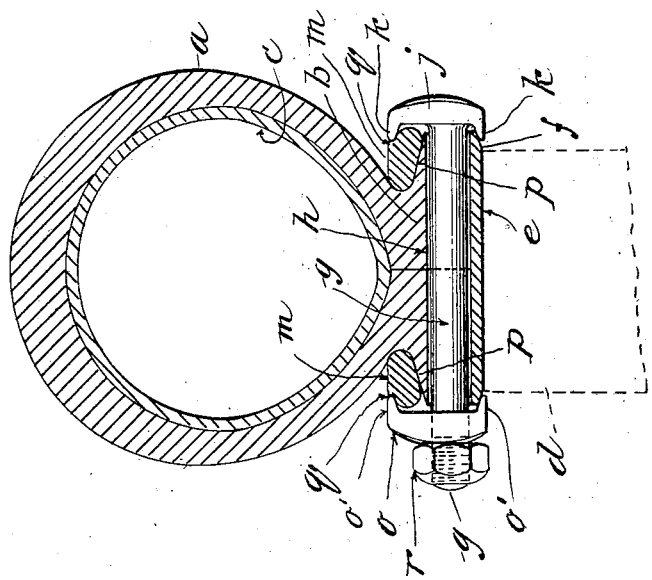
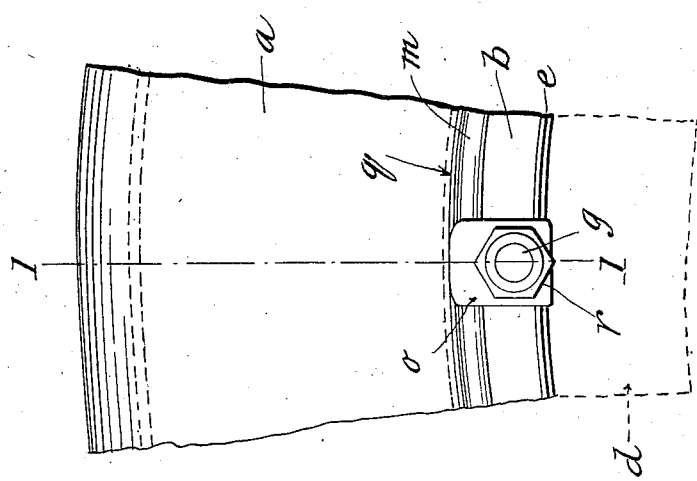
Witnesses:
H. L. Sprague
E. L. Smith
Inventor:
John C. Cole
by Chapin & Co.
Attorneys

UNITED STATES PATENT OFFICE.

JOHN C. COLE, OF CHICOPEE FALLS, MASSACHUSETTS, ASSIGNOR TO THE FISK RUBBER COMPANY, OF CHICOPEE FALLS, MASSACHUSETTS, A CORPORATION.

TIRE CONSTRUCTION.

No. 826,143.

Specification of Letters Patent.

Patented July 17, 1906.

Application filed March 16, 1905. Serial No. 250,389.

*To all whom it may concern:*

Be it known that I, JOHN C. COLE, a citizen of the United States of America, residing at Chicopee Falls, in the county of Hampden and State of Massachusetts, have invented new and useful Improvements in Tire Construction, of which the following is a specification.

This invention relates to vehicle-tire construction, and is in the nature of an improvement on the construction shown in United States Letters Patent issued to me on March 25, 1902, No. 696,391, the object of the invention being to improve the construction of the devices whereby the tire is secured to the wheel, whereby they are made more effective, all as fully described in the specification and summarized in the claims.

The invention is fully illustrated in the accompanying drawings, in which—

Figure 1 is a cross-sectional view of a tire to which the invention has been applied, the plane of the section being on line 1 1, Fig. 2. Fig. 2 is a side elevation of a portion of a tire, showing portions of the improved clamping devices applied thereto.

Referring to the drawings, $a$ indicates the outer casing of a pneumatic tire having a flanged base $b$, which is divided on a central circumferential line to permit the insertion of an inner tube $c$ therein, and it is in connection with a tire of this type that the invention is generally employed, though not necessarily so, as it may be used in connection with any tire having a flanged base, substantially as shown in the drawings.

The mechanical elements whereby the tire is secured to the wheel are substantially the same as those described in the said patent to me; and the invention consists in certain improvements in these elements and in the rim of the wheel to which the tire is secured.

In the drawings no part of the wheel has been shown but the rim, except that a portion of the felly has been outlined in dotted lines and is indicated by $d$. To this is secured the circumferentially-disposed metal rim $e$, which, as in the said patent, is flat and preferably, as shown in the accompanying drawings, overhangs each side of the felly a little, the under side of said rim edge being beveled, as at $f$. A series of bolts $g$ extend through transversely-located slots $h$ in the base $b$ of the tire, which slots are open in the plane of the under side of the base, as in the said patent, and on one end of said bolts is a head $j$, T-shaped in cross-section, the lips $k$ of which overlap the beveled edge $f$ of the rim $e$ and the outer edge of a retaining-ring $m$. The opposite end of the bolt is provided with a washer $o$, having lips $o'$ thereon similar to the lips $k$ on the head of the bolt and which, like the latter, overlap, respectively, the opposite beveled edge of the rim and the retaining-ring. The latter, like the retaining-rings of the said patent, are made endless and are fitted over the outwardly-beveled exterior surfaces $p$ of the flanged base $b$ of the tire and in overlapping relation relative to the outer edges of the rim $e$. Unlike the construction shown in said patent, however, the outer edge of these rings is curved on the upper side, as well as the lower, whereby all sharp edges against which the tire when deflated might bear are eliminated, and preferably these rings are provided with a shoulder $q$, extending circumferentially around the ring at some little distance within the outer edge thereof, against which the lips $o'$ and $k$ of the washer $o$ and the head $j$ of the bolt may come to a bearing, whereby these rings may be more effectually pushed inwardly on the inclined surfaces $p$ of the base of the tire when the nut $r$ on the outer end of the bolt is screwed up. When the rings are made without these shoulders $q$, there is a tendency of the lips on the washers and bolt-head to slide up on the curved outer surface of the rings and force the latter prematurely toward the rim $e$, whereas the proper action of these parts is that in which the advance of the rings on the inclined portion $p$ of the base effects a coincident binding of the latter to the rim. In this construction, however, there is a double binding effect—viz., by the action of the ring on the inclined portions of the base, as described, and by the cam-like action of the washers $o$ and the heads of the bolts overlapping, as they do, two inclined surfaces—viz., that on the under side of the rim and that on the outer edge of the rings—and the clamping effect therefore is much greater than when the construction described in the said prior patent to me is used, for in that construction all of the constricting effect is due to the movement of the rings on the inclined outer surfaces of the base of the tire.

The clamping effect in the use of the present invention is enough greater than that in the said patent to me to permit doing away with the recesses in the edge of the rims described in said patent, whereby circumferential displacement of the bolts is rendered impossible. Another advantage incidental to the herein-described construction is that as soon as the nuts $r$ are loosened the disengagement of the washers $o$ and the heads of the bolts from the rings and rims is most easily accomplished, because of the fact that they bear entirely on outwardly-inclined surfaces. Furthermore, a distinct advantage in the present construction lies in the fact that there is a greater range of action between the bolt-head and washer and the rings $m$, constructed, as are the former, with the inwardly-extending lips $o'$ and $k$, as these lips may be so proportioned that the rings $m$ may be pushed inward to operative position over the edge of the rims $e$ before the body of the washer or bolt-head may come in contact with the edge of the rim or the edge of the base of the tire, whereas, as in the said prior patent to me, the clamping devices become ineffective for further action as soon as the outer edge of the ring becomes coincident with the plane of the edge of the base of the tire.

Having thus described my invention, what I claim, and desire to secure by Letters Patent of the United States, is—

1. The combination of a tire having a flanged base, of a wheel-rim on which said base is seated, clamping-rings to fit over the edges of said base in overlapping relation with the borders of the rim, the outer edges of the latter being beveled from the under side thereof outwardly, together with bolts located transversely of the rim, and means on the bolts to engage the rings and the beveled edges of the rim whereby when nuts on the bolts are screwed up, said rings may be drawn toward the rim to secure the base of the tire to the latter.

2. The combination of a tire having a flanged base, of a wheel-rim on which said base is seated, clamping-rings to fit over the edges of said base in overlapping relation with the borders of the rim, the outer edges of the rings and the rim being beveled, together with bolts extending transversely of the rim, and means on the bolts to engage said beveled surfaces of the rings and of the rim, whereby the screwing up of nuts on the bolts may effect the clamping of the tire-base to the rim.

3. The combination with a wheel and a metal rim thereon, of a tire having a flanged base seated on said rim, rings of larger diameter than the rim located in overlapping relation to the latter on the base of the tire; bolts extending transversely of the rim through openings in the base of the tire, the upper side of said rings and the under side of the outer edge of the rims having inclined surfaces, and a head and a washer on said bolts having lips thereon to bear on said inclined surfaces when a nut on the bolt is screwed up.

4. The combination with the rim of a wheel, the under side of the borders of which are outwardly beveled, of a tire having a flanged base seated on said rim, and clamping-rings fitting over the edges of said base, and clamping means operatively engaging the beveled edges of said rim to move said rings one toward the other and toward said rim.

5. A tire construction comprising the rim of a wheel to receive the flanged base of a tire, clamping-rings of greater diameter than the rim, located on the base of the tire in overlapping relation to the borders of the rim, said rings having a circumferentially-disposed shoulder on the outer surface thereof; bolts extending transversely of the rim, and means on the bolts to engage the borders of said rim and to bear on said ring against the shoulders thereof to effect the clamping of the tire to the rim by screwing up bolts on the nuts.

6. In a construction of the class described, the combination with a tire having a flanged base, of the rim of a wheel to receive said base, clamping-rings to fit over the latter provided with circumferentially-disposed shoulders thereon, and beveled surfaces extending from the base of said shoulders outwardly and downwardly, and suitable fastening devices having a bearing on the shoulders on the rings to secure the latter on the base of the tire.

7. In a construction of the class described, the combination with a tire having a flanged base, of the rim of a wheel to receive said base, and clamping-rings to fit over the latter provided with circumferentially-disposed shoulders thereon, and beveled surfaces extending from the base of said shoulders outwardly and downwardly, the under side of the borders of said rim being also beveled in a plane converging toward the plane of the beveled surfaces on the rings, clamping-bolts extending transversely of the rim and provided with flanged heads or washers to engage the beveled surfaces of said rings and rims by the screwing up of nuts on said bolts.

JOHN C. COLE.

Witnesses:
WM. H. CHAPIN,
K. I. CLEMONS.